Figure 1:
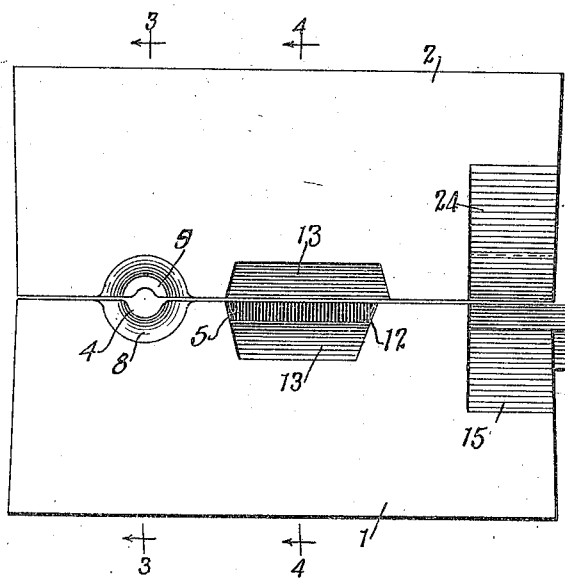

E. T. McPHERSON.
METHOD OF MAKING SHANKS FOR BORING TOOLS.
APPLICATION FILED APR. 20, 1916.

1,254,715.

Patented Jan. 29, 1918.
2 SHEETS—SHEET 1.

Inventor
Elmer T. McPherson,

By
Attorneys

E. T. McPHERSON.
METHOD OF MAKING SHANKS FOR BORING TOOLS.
APPLICATION FILED APR. 20, 1916.
1,254,715.
Patented Jan. 29, 1918.
2 SHEETS—SHEET 2.
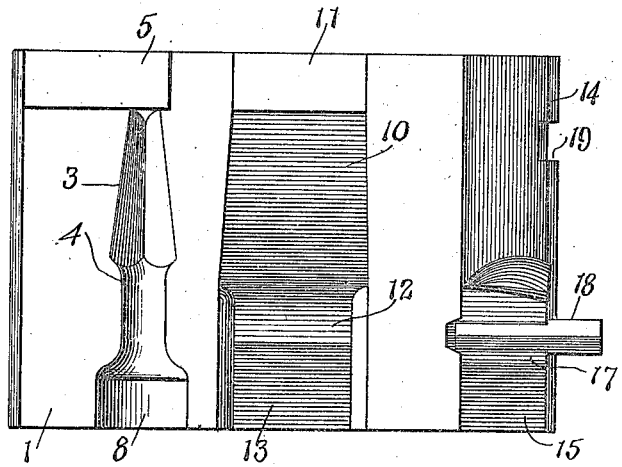
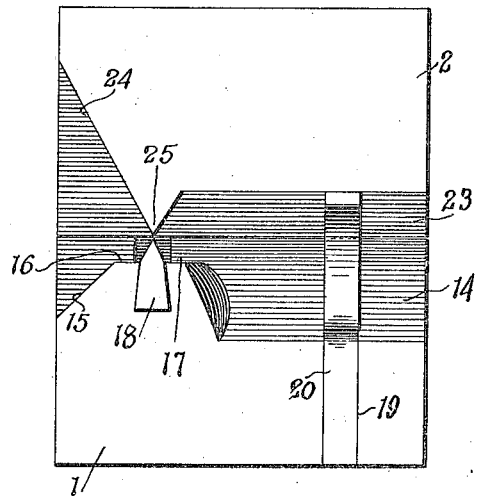
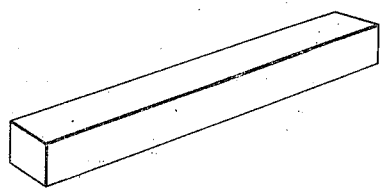
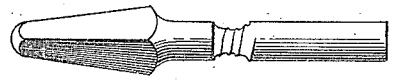
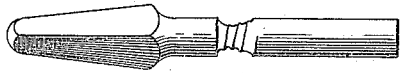
Inventor
Elmer T. McPherson,
By
Attorneys

UNITED STATES PATENT OFFICE.

ELMER T. McPHERSON, OF WILMINGTON, OHIO, ASSIGNOR TO THE IRWIN AUGER BIT COMPANY, OF WILMINGTON, OHIO, A CORPORATION OF OHIO.

METHOD OF MAKING SHANKS FOR BORING-TOOLS.

1,254,715. Specification of Letters Patent. Patented Jan. 29, 1918.

Original application filed December 23, 1915, Serial No. 68,307. Divided and this application filed April 20, 1916. Serial No. 92,348.

*To all whom it may concern:*

Be it known that I, ELMER T. MCPHERSON, a citizen of the United States, residing at Wilmington, in the county of Clinton and State of Ohio, have invented certain new and useful Improvements in Methods of Making Shanks for Boring-Tools, of which the following is a specification, reference being had therein to the accompanying drawings.

This invention relates to a method of making shanks for boring tools such as twist drills. In a copending application filed by me December 23, 1915, Ser. No. 68,307, on which Letters Patent No. 1,193,037 were granted August 1st, 1916, the method was fully described and illustrated, the present application constituting a division thereof.

In the manufacture of auger bits and similar articles it is customary to forge the bit from a bar of steel which is usually square or round in cross section. The forging of the shank, which is usually in the form of a tapered square, and the round thereof requires a series of operations and it is accomplished by means of power operated hammers provided with dies of the proper shape. Dies commonly used for this purpose are such that the character of the work is left more or less to the judgment and skill of the operator. As a result there is apt to be considerable variation between different articles which are supposed to be exactly alike. This is particularly true in connection with the shank. In a given size of bit or drill these shanks are supposed to be of exactly the same dimensions but in practice they will frequently vary to a noticeable extent in width and thickness and in length of the taper. In a drop forge the work has to go through the forming, clipping, finishing and forging operations. After it is forged it takes three or more operations to grind, true and standardize the shank. In the trade there is also a considerable demand for the shanks alone, as this shank can be purchased and the owner thereof can later weld to the same a bit or drill whenever needed. When these shanks have been purchased heretofore it has been necessary for the purchaser to grind, true and standardize the same before using, requiring the presence of the necessary tools and a great deal of extra labor.

An object of the present invention is to devise a method for producing a finished shank of uniform character with a minimum of operations. Another object of the invention is to devise a method for roughing out the shank and a portion of the round and forming a notch in the round where the shank can be severed. The invention may include in one continuous operation the steps necessary to realize both of the above objects or only a part of the steps may be utilized and still be within the scope of the invention. For instance, in some cases the shank and round only may be roughed out by my method; in others the round may be additionally notched; in others the shank will be finished either with or without first notching the round and finally the portions can be severed at the notch as desired.

Figure 3:
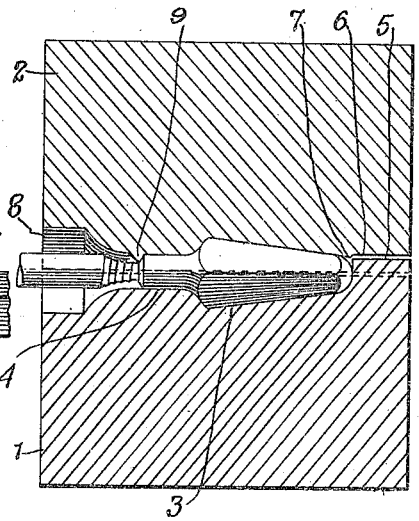
Figure 2:
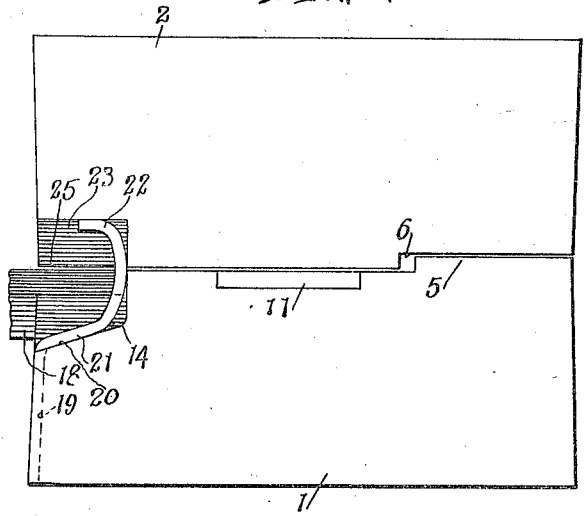
Figure 4:
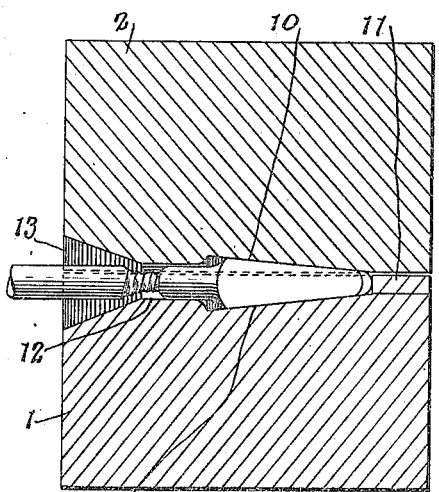

In the accompanying drawings, Figure 1 is a front elevation of the dies used in carrying out the method embodying the invention; Fig. 2 is a rear elevation of the same; Fig. 3 is a sectional view on the line 3—3 of Fig. 1, looking in the direction of the arrows; Fig. 4 is a sectional view taken on the line 4—4 of Fig. 1, looking in the direction of the arrows; Fig. 5 is a top, plan view of the lower or anvil die; Fig. 6 is a side elevation showing the knife edges; and Figs. 7 to 10 show the article in the several steps of making.

In carrying out the following method the shank and round of the bit or drill are usually formed from stock, either square or round bars. In the drawings I have shown in Fig. 7 a square blank designed for the production of the shank and round of a twist drill. This blank is first heated to the necessary temperature and is then placed between dies of suitable design which will vary with the nature of the shank and the design thereof. The dies are so arranged that when they are brought together to form the shank and round the size of the said shank and round will be predetermined or definite. In the working of this first operation it will be understood that the upper die reciprocates and will strike the blank upon the lower die to give it the shape of the die. During successive impacts of the upper die upon the lower die the blank or stock is continually turned to even up the various sides as much as possible. At this stage of the operation the round of the bit adjacent the shank is notched to produce a reduced and weakened portion therein, the purpose of which will be described hereafter. It is to be understood, however, that the indentation or notch may be placed upon the shank during the later stage of the operation. After the steps above described the stock or blank will assume the form of a shank and round which is rough in general form but contains a definite amount of material and is of predetermined size. The article formed at this stage of the operation is illustrated in Fig. 8 of the drawings. It will be understood that any means may be used for performing the operation above described and especially for making the shanks of all the same or uniform size containing substantially the same amount of material.

The next series of operations in connection with this method consists in finishing the shank. The first step in this connection is to place the roughed out shank, which is usually a tapered square, upon a base or anvil in a predetermined position. Inasmuch as it is the object of this invention to produce a series of uniform articles of substantially the same size it is necessary that the shanks be placed relatively to the front and rear at substantially the same point upon the base in each case. This is usually determined by a stop. The next operation is to cause an upper surface to strike the article located upon the lower surface. Between each succeeding impact of the hammer or upper die the shank is turned. In the case of a tapered square shank the surfaces will converge toward each other and there will be a stop upon the lower surface to determine the location of the shank and the shank will be turned a quarter of a turn after each impact. By these steps the shanks are finished in a manner to make them all uniform in size and of symmetrical, finished form.

The next step in the operation is the severing of the stock from the finished shank. This is done by placing the shank upon a knife edge at one side of the die, or elsewhere, and causing the upper die to fall and sever it. Any suitable means, however, may be used for severing the stock from the shank. The severing, however, of the material is performed at the notched portion which was described above.

It will be seen that by the above operations an article has been formed which is perfect in form and is of uniform size. It will further be seen that the article thus made may be made by means of a die, with a minimum of operations or steps and with one heating.

In the accompanying drawings, I have illustrated a particular form of device which can be used in carrying out the above method.

In the said drawings 1 indicates a lower die and 2 an upper die, the lower die constituting the anvil die and the upper die the hammer die. As will be readily understood, the lower die is mounted in a fixed position upon a support or anvil, while the upper die is carried by the hammer or the like and is arranged in exact alinement with the lower die. The two parts have their adjacent surfaces shaped to correspond to the character of the work which it is desired to produce, each die being cut away to form a recess of such a shape that it will receive the adjacent half of the work. In the above dies we have shown the recesses adapted for use in connection with shanks with tapered squares. It will be understood that any other form of shank can be made by means of this device and will be within the scope of the invention. As shown, I have provided the dies with coöperating portions, each having an angular recess 3 and a curved recess 4. The angular recess is preferably V-shaped in cross section and the curved recess is approximately semicircular in shape, although its width at the top may be more than twice its depth. The V-shaped recess is tapered and the tapered end thereof is closed by a wall or stop 5. This stop is preferably carried by the lower die and extends above the upper surface of that die far enough to close the end of the tapered recess in the upper die when the latter die is resting upon the former, thus forming a solid stop against which the end of the work may abut. The upper die is cut away, as shown at 6, to receive the portion of the stop which projects above the surface of the lower die and has a shoulder 7 extending in front of said stop when the said stop is in the said recess. The recesses in the dies are enlarged at the end opposite to the tapered portion of the same, as shown at 8. By so enlarging the recesses at the front end the blank can be easily rotated. Projecting into the space formed by means of the alined recesses of the two dies is a semi-annular rib 9 which is adapted to cut into the round of the bit adjacent the shank, as shown in Fig. 3. As the said shank is rotated the rib 9 will impart to the same a more or less screw-threaded effect, as clearly shown in the drawings, special reference being made to Figs. 8 and 9.

The device above described presents a novel means for performing the roughing out operations set forth above in describing the method. It is thought that the operation of this part of the die will be obvious.

The means that I employ for performing the finishing operation described above consists of a flat portion 10 with which each die is provided, the flat portions of the two dies converging, as shown in Fig. 4. In forming these flat portions the dies are cut away so that when one die rests upon the other the space between the two inclined portions of the dies will correspond in taper and depth to the taper and thickness of the finished square of the bit. The finishing operation of the square tends to draw the same to a slightly greater length, as shown in Fig. 9, and to give the same a smoother finish than imparted thereto by the roughing out portion of the die. The lengths of the inclined portions of the dies are usually greater than the length of the square or shank of the bit and I have, therefore, provided a stop 11 against which the end of the square may be placed and which serves to regulate the draw and size of the taper. It will be understood that by varying the position of the stop 11 the size of the square may be varied. In the use of the dies the roughing out portions thereof will usually wear more rapidly than the finishing portions thereof. When the die has worn to such an extent that it will no longer give accurate results it is re-cut to the next larger size. By making the stop 11 adjustable these portions of the dies which finish the square can be utilized for finishing a different size of square without re-cutting which is of material importance, as the cost of making dies is very great. The stop is arranged to have a driving engagement with a groove within the lower die so that it may not be accidentally displaced, but can be adjusted by driving the same from one position to another. The lower die 1 is provided at that end of the inclined portions opposite the stop 11 with a shoulder or rest portion 12 upon which the round of the bit rests while the square is being finished and which serves to support the bit in a proper position with relation to the inclined portions of the dies and prevent the distortion of the round. In front of the rest 12 the recesses in the upper and lower dies have been enlarged, as shown at 13, for the purpose of allowing for the rotation of the shank within the dies.

It will be understood that while I have shown and described a device for making a tapered square shank, to make a device for other shapes and forms is within the scope of the invention.

After the finishing of the shank of the bit the next step in the method above described is the severing of the shank from the remaining portion of the stock, and to do this I have devised a novel arrangement of cutting device and support. The die 1 at one side has been cut away to form an inclined bevel, as shown at 14. The die has also been cut away at 15 and the horizontal portion has been cut away, as shown at 16, the cutting away of these three portions leaving a ledge 17. This ledge 17 has a slot therein, in which is located a knife 18 whose upper edge is in line with the upper edge of the die 1. At one side of this knife 18 the vertical portion of the side of the die 1 has therein a groove 19. Within this groove 19 is located a hook 20 extending vertically and bent back, as shown at 21, the portion 21 lying flat against the inclined portion 14. The hook 20 extends above the plane of the lower die, as shown at 22, and curves outwardly. The upper die, as shown at 23, has a portion cut away, the upper portion of the hook 22 fitting within this portion. A bevel surface 24 coöperates with the side of the recess 23 to form a knife edge 25 coöperating with the knife edge 18 to form a cutter.

After the finishing operation the article takes the form shown in Fig. 9. It will now be desired to sever the formed shank from the surplus stock. In doing this the article shown in Fig. 9 is placed upon the knife edge 18 at the reduced or notched portion thereof, the shank extending over the knife edge to the right, as shown in Fig. 6, and the end thereof extending under the hook. The other end of the shank comprising the unused stock being held in the hand, the first-mentioned end of the shank is forced up against the under side of the hook by pressing downward on the unused stock. By this arrangement the axis of the shank and the unused stock attached thereto will be parallel with the face of the die, the relative positions of the knife edge and the under side of the hook being such as to allow this. It will thus be seen that the article will be held securely upon the knife edge of the lower die, the hook insuring the proper position of the shank thereon and preventing upward rotation. When the knife edge 25 descends the shank will be severed from the surplus stock and will fall into a basket or other receptacle at the side of the die.

The operation of the dies will be readily understood. The complete operation is performed with one heating of the metal and the location and arrangement of the several parts of the dies are such that the operations are quickly and easily performed and the work accurately controlled so that the finished articles are uniform.

The parts of the dies above described which coöperate to form a finished shank of a uniform nature are illustrated, described and claimed in an application filed by me May 20, 1915, Ser. No. 29,284, on which Letters Patent 1,184,111 were granted May 23rd, 1916.

Having thus fully described my invention, what I claim as new and desire to secure by Letters Patent, is:—

1. The herein described method of making tapered shanks with flat sides which consists in heating the stock to the required temperature, placing the heated stock between dies of suitable contour to produce a shank of predetermined size, subjecting said shank to successive impacts of said dies, meanwhile turning the stock between impacts, forming a notch at one end of the shank, placing the roughly formed shank on a surface in a predetermined position, subjecting the said shank to the successive impacts of another surface arranged at an angle to the first-mentioned surface so that it will squarely engage the flat side of the shank and meanwhile turning the shank between impacts yet retaining the same in the same relative predetermined position and then severing the shank at the notch.

2. The herein described method of making tapered shanks with flat sides which consists in heating the stock to the desired temperature, placing the stock between dies of suitable contour to produce a shank of predetermined size, subjecting the said shank to the impact of said dies, forming a notch on the round adjacent one end of the shank, placing the roughly formed shank on a surface in a definite fixed position, subjecting the shank to the successive impacts of another surface arranged at an angle to the first-mentioned surface so that it will squarely engage the flat side of the shank, meanwhile turning the shank between impacts to bring the several surfaces thereof in position to receive the same, retaining the said shank in definite fixed position and then severing the same at the notch.

3. The herein described method of making shanks for boring tools which consists in notching the round adjacent the shank during the forging operation and then severing the shank at the notch.

4. The herein described method of making shanks for boring tools which consists in heating stock to the desired temperature, placing the heated stock between dies of suitable contour, subjecting the stock to the successive impact of the dies and turning the same between impacts and forming a notch on the round adjacent the shank where it can be severed.

In testimony whereof, I affix my signature.

ELMER T. McPHERSON.

Copies of this patent may be obtained for five cents each, by addressing the "Commissioner of Patents, Washington, D. C."